(12) United States Patent
Fan et al.

(10) Patent No.: US 6,442,657 B1
(45) Date of Patent: Aug. 27, 2002

(54) FLAG GENERATION SCHEME FOR FIFOS

(75) Inventors: Junfei Fan, Mississippi State; Daniel Eric Cress, Starkville, both of MS (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/371,237

(22) Filed: Aug. 10, 1999

(51) Int. Cl.[7] .............................................. G06F 12/00
(52) U.S. Cl. ..................... 711/156; 710/54; 365/189.07; 365/189.12; 365/220; 365/221
(58) Field of Search .................... 710/54; 365/220–221, 365/189.07, 189.12; 711/156; 395/877

(56) References Cited

U.S. PATENT DOCUMENTS

| | | | |
|---|---|---|---|
| 5,587,953 A | 12/1996 | Chung | 365/220 |
| 5,627,797 A | 5/1997 | Hawkins et al. | 365/221 |
| 5,712,992 A | 1/1998 | Hawkins et al. | 395/877 |
| 5,809,339 A | 9/1998 | Hawkins et al. | 395/877 |
| 5,850,568 A | 12/1998 | Hawkins et al. | 395/877 |
| 5,852,748 A | 12/1998 | Hawkins et al. | 710/54 |
| 5,991,834 A | 11/1999 | Hawkins et al. | 710/57 |
| 6,016,403 A | 1/2000 | Hawkins et al. | 395/877 |
| 6,070,203 A | 5/2000 | Hawkins et al. | 710/57 |

OTHER PUBLICATIONS

64K/128Kx9 Deep Sync FIFOs w/Retransmit & Depth Expansion, Cypress Preliminary CY7C4282 and CY7C4292, Cypress Semiconductor Corporation, Revised Nov. 6, 1997, pp. 1–16.

*Primary Examiner*—Do Hyun Yoo
*Assistant Examiner*—Mehdi Namazi
(74) *Attorney, Agent, or Firm*—Christopher P. Maiorana, P.C.

(57) ABSTRACT

The present invention concerns a circuit comprising a memory, a flag/array address circuit and a flag logic circuit. The memory may be configured to read and write data in response to one or more memory address signals. The flag/array address circuit may be configured to present one or more flag address signals in response to (i) one or more enable signals and (ii) a control signal. The flag logic circuit may be configured to present one or more logic flags in response to the one or more flag address signals.

22 Claims, 3 Drawing Sheets

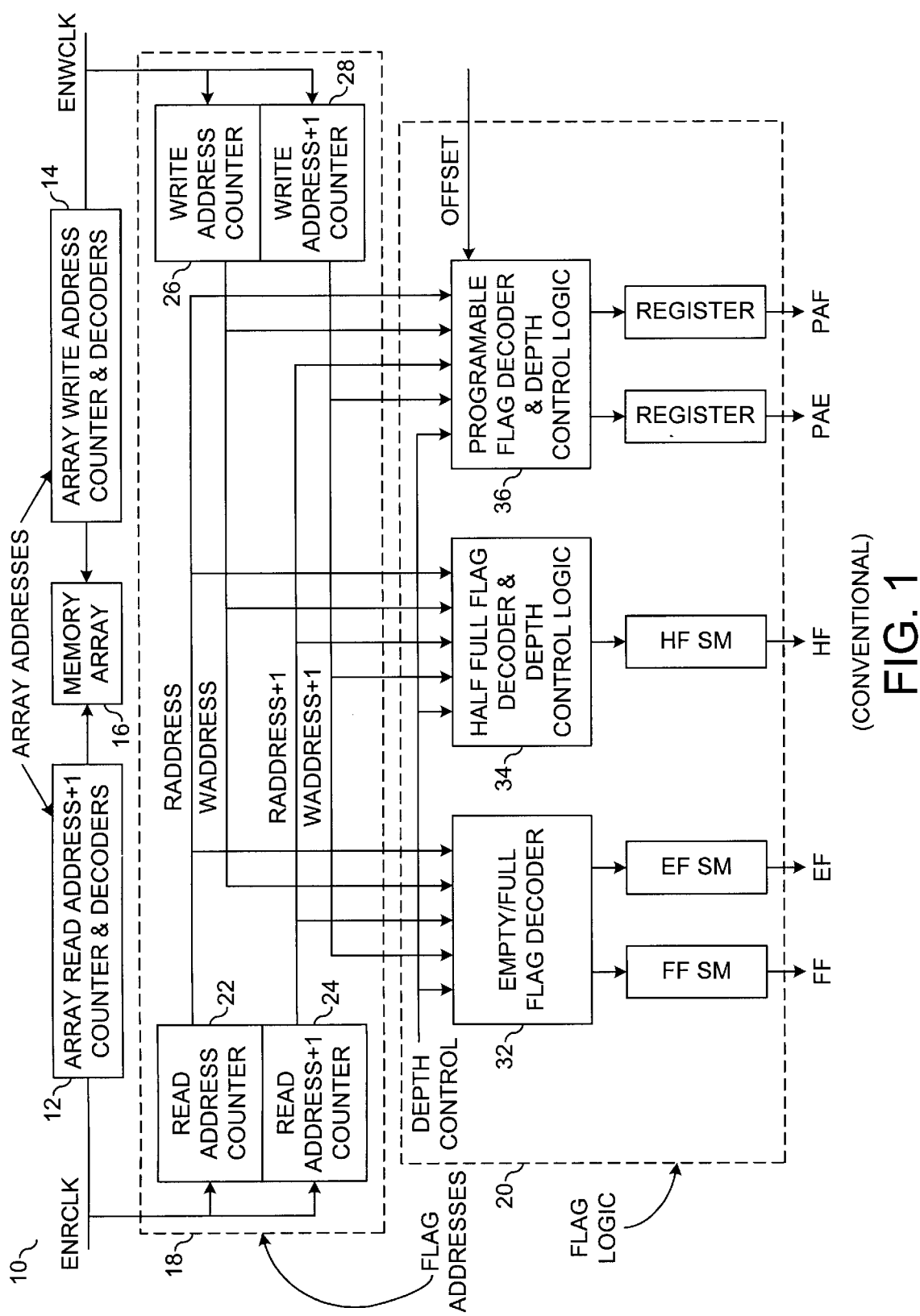
FIG. 1
(CONVENTIONAL)

FLAG GENERATION SCHEME FOR FIFOS

FIELD OF THE INVENTION

The present invention relates to FIFO buffers generally, and more particularly, to a method for generating FIFO status flags in a hybrid embedded Dual-Port/FIFO memory.

BACKGROUND OF THE INVENTION

Conventional flag generation circuits used in first-in first-out (FIFO) memories can use four dedicated flag address counters. Conventional depth expansion logic is implemented as part of the flag logic circuit. Consequently, changes in the depth expansion logic are made within the flag logic.

Referring to FIG. 1, a conventional circuit 10 for generating status flags is shown. The circuit 10 comprises an array read address counter 12, an array write address counter 14, a memory array 16, a flag address block 18, and a flag logic block 20. The circuit 10 increases the die size due to the required separation of the array address counters 12 and 14 from the flag address circuit 18.

The array read address counter 12 is coupled to the memory array 16. An enable read signal ENRCLK is presented to the array read address counter 12 as well as to the flag address circuit 18. The array write address counter 14 is also coupled to the memory array 16. An enable write signal ENWCLK is presented to the array write address counter 14 as well as to the flag address circuit 18.

The flag/array address circuit 18 comprises a read address counter 22, a read address+1 counter 24, a write address counter 26, and a write address+1 counter 28. The enable read signal ENRCLK is presented to the read address counter 22 and the read address+1 counter 24. The read address counter 22 presents a read signal RADDRESS in response to the enable read signal ENRCLK. The read address+1 counter 24 presents read plus one signal RADDRESS+1 in response to the enable read signal ENRCLK. The enable write signal ENWCLK is presented to the write address counter 26 and the write address+1 counter 28. The write address counter 26 presents a write signal WADDRESS in response to the enable write signal ENWCLK. The write address+1 counter 28 presents a write plus one signal WADDRESS+1 in response to the enable write signal ENWCLK.

The flag logic 20 presents a plurality of control signals in response to the signal RADDRESS, the signal RADDRESS+1, the signal WADDRESS, the signal WADDRESS+1, a depth control signal DEPTH CONTROL and an offset signal OFFSET. The flag logic circuit 20 comprises an empty/full flag decoder 32, a half full flag and depth control logic 34, and a programmable flag and depth control logic 36, which each receive the signal RADDRESS, the signal RADDRESS+1, the signal WADDRESS, the signal WADDRESS+1, and the signal DEPTH CONTROL. The programmable flag and depth control logic 36 receives an additional offset signal OFFSET. To implement depth configuration, the signal DEPTH CONTROL is used within the flag logic circuit 20. The depth control logic is implemented as part of the flag logic circuit 20. Therefore, changes to the depth expansion must be made within the flag logic circuit 20.

SUMMARY OF THE INVENTION

The present invention concerns a circuit comprising a memory, a flag/array address circuit and a flag logic circuit. The memory may be configured to read and write data in response to one or more memory address signals. The flag/array address circuit may be configured to present one or more flag address signals in response to (i) one or more enable signals and (ii) a control signal. The flag logic circuit may be configured to present one or more logic flags in response to the one or more flag address signals.

The objects, features and advantages of the present invention may include implementing a flag generation scheme that may (i) provide a highly efficient architecture for generating flag logic addresses and array addresses, (ii) save real estate in an embedded design by sharing the array address with the flag address, (iii) implement the depth control circuitry separately from the flag logic circuitry, (iv) implement a depth control circuit that may be programmed without changing the flag logic, and/or (v) provide a portable flag generation block that may easily augment a Dual-Port design for use as a FIFO.

BRIEF DESCRIPTION OF THE DRAWINGS

These and other objects, features and advantages of the present invention will be apparent from the following detailed description and the appended claims and drawings in which:

FIG. 1 illustrates a diagram of a conventional FIFO flag generation logic circuit;

DETAILED DESCRIPTION OF THE PREFERRED EMBODIMENTS

The present invention concerns a circuit and method for generating FIFO logic flags. An address generation circuit may be shared by a flag address generation circuit and array address generation circuit that may reduce the die size in embedded FIFO designs. The present invention may be implemented as a portable design that may allow easy augmentation of the flag logic to a memory (e.g., a Dual-Port design). The dual port design may be implemented as a FIFO buffer. The present invention may also allow programming of depth reconfiguration without changing the FIFO flag logic. For example, for a 4K bit array, the flag logic 140 may be implemented to be 4K in depth, and may be used in any array configurations that are less than 4K in depth. The depth configuration may be reconfigured from a 4K×1 to a 2K×2, 1K×4, ½K×8, etc. without change of the flag logic 140. configuration may be reconfigured from a 4K×1 to a 2K×2, 1K×4, ½K×8, etc. without change of the flag logic 140.

Figure 2:
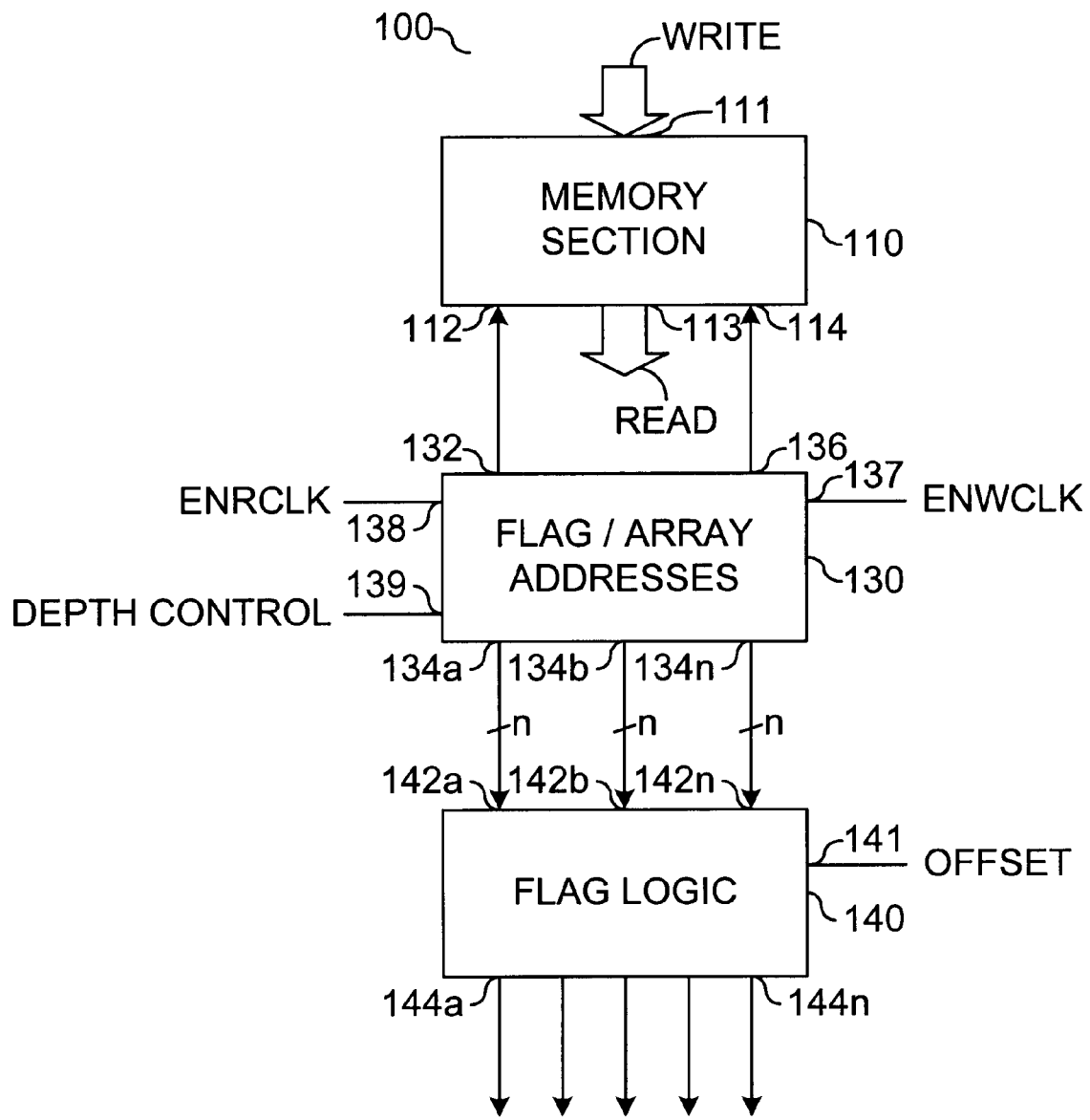
FIG. 2 illustrates a block diagram illustrating a preferred embodiment of the present invention.

Referring to FIG. 2, a block diagram of a circuit 100 is shown in accordance with a preferred embodiment of the present invention. The circuit 100 generally comprises a memory section 110, a flag/array addresses block (or circuit) 130, and a flag logic block (or circuit) 140. The memory 110 generally writes data received at an input 111 and reads data to be presented to an output 113. The memory 110 may read and write data in response to a first counter signal received at an input 112 and a second counter signal received at an input 114, respectively.

The flag/array address circuit 130 may present the first counter signal at an output 132, the second counter signal at an output 136 and a plurality of signals at outputs 134a–134n. The signals presented at the outputs 134a–134n may be flag address signals. Each of the outputs 134a–134n may present a plurality of flag address signals n, where n is an integer. The flag/array address circuit 130 may present the first and second counter signals and the plurality of the address signals in response to a first enable signal (e.g., enable write signal ENWCLK received at an input 137), a second enable signal (e.g., enable read signal ENRCLK received at an input 138), a control signal (e.g., control signal DEPTH CONTROL received at an input 138) and an offset signal (e.g., OFFSET received at an input 141). In one example, the signal DEPTH CONTROL may be a multi-bit signal. The signal DEPTH CONTROL may be used, in one example, to mask one or more unused address bits.

The flag logic circuit 140 generally presents a plurality of status flag signals at a number of outputs 144a–144n in response to one or more of the plurality of address signals received at inputs 142a–142n. The status flags presented at the outputs 144a–144n maybe a full flag (e.g., FF), an empty flag (e.g., EF), a half full flag (e.g., HF), a programmable almost empty flag (e.g., PAE), a programmable almost full flag (e.g., PAF), or other appropriate status flag required to meet the design criteria of a particular implementation.

Figure 3:
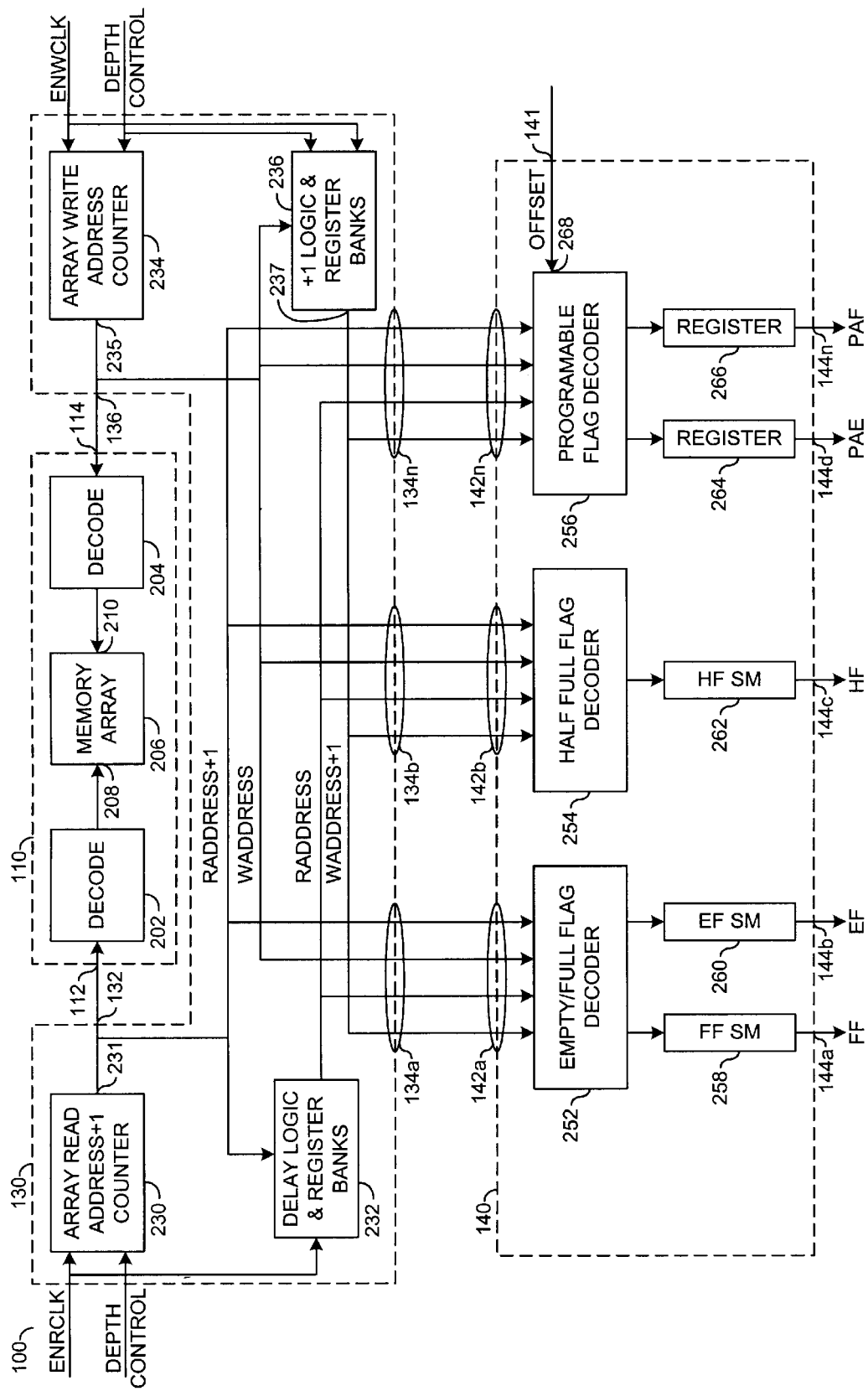
FIG. 3 illustrates a more detailed block diagram of the circuit of FIG. 2.

Referring to FIG. 3, a more detailed block diagram of the circuit 100 is shown in accordance with a preferred embodiment of the present invention. The memory 110 generally comprises a first decoder 202, a second decoder 204 and a memory array 206. The first decoder 202 may present a first decoded signal to an input 208 of the memory array 206. The first decoded signal may be generated in response to the first counter signal received at the input 112. The second decoder 204 may present a second decoded signal to an input 210 of the memory array 206. The second decoded signal may be generated in response to the second counter signal received at the input 114. In one example, first counter signal may be a read address signal (e.g., read address plus one signal RADDRESS+1) and the second counter signal may be a write address signal (e.g., write address signal WADDRESS).

The flag/array address circuit 130 generally comprises a counter 230, a delay logic and register bank 232, a counter 234, and a +1 logic and register bank 236. The counter 230 may be implemented, in one example, as an array read address+1 counter. The counter 234 may be implemented, in one example, as an array write address counter. The array read address+1 counter 230 may present the read address plus one signal RADDRESS+1 at an output 231 in response to the enable read signal ENRCLK and the control signal DEPTH CONTROL. The enable read signal ENRCLK and the read address plus one signal RADDRESS+1 may also be presented to the delay logic and register bank 232. The delay logic and register bank 232 may present a read address signal (e.g., read address signal RADDRESS) at an output 233 in response to the enable read signal ENRCLK and the read plus one address RADDRESS+1.

The array write address counter 234 may present a write address signal (e.g., write address signal WADDRESS) at an output 235 in response to the enable write signal ENWCLK and the control signal DEPTH CONTROL. The enable write signal ENWCLK, the control signal DEPTH CONTROL and the write address signal WADDRESS may also be presented to the +1 logic and register bank 236. The +1 logic and register bank 236 may present a write address signal (e.g., write address plus one signal WADDRESS+1) at an output 237 in response to the enable write signal ENWCLK, the control signal DEPTH CONTROL and the write address signal WADDRESS.

The first flag address signal of each of the plurality of flag address signals 134a–134n generally comprises the write address plus one signal WADDRESS+1. The second flag address signals of each of the plurality of flag address signals 134a–134n generally comprises the read address signal RADDRESS. The third flag address signal of each of the plurality of flag address signals 134a–134n generally comprises the write address signal WADDRESS. The last flag address signal of each of the plurality of address signals 134a–134n generally comprises of the read address plus one signal RADDRESS+1. However, other appropriate signals may be presented at the outputs 134a–134n to meet the design criteria of a particular implementation.

The flag logic circuit 140 generally presents one or more status flag signals at one or more of the outputs 144a–144n. The status flag signals may be generated in response to the plurality of address signals received at inputs 142a–142n. The flag logic circuit 140 generally comprises an empty/full flag decoder 252, a half full flag decoder 254, a programmable flag decoder 256, a state machine 258, a state machine 260, a state machine 262, a register 264, and a register 266.

The empty/full flag decoder 252 generally presents a first signal to the state machine 258 and a second signal to the state machine 260 in response to the plurality of address signals received at the input 142a. In one example, the state machine 258 may be implemented as a full flag state machine and the state machine 260 may be implemented as an empty flag state machine. The full flag state machine 258 may present the status flag FF at the output 144a. The empty flag state machine 260 may present the status flag EF at the output 144b.

The half-full flag decoder 254 generally presents a third signal to the state machine 262 in response to the plurality of address signals received at input 142b. In one example, the state machine 262 may be implemented as a half-full flag state machine. The half-full flag state machine 262 may present the status flag HF at the output 144c.

The programmable full flag decoder 256 generally presents a first output to the register 264 and a second output to the register 266, each in response to the plurality of address signals received at the input 142n and the signal OFFSET received at an input 268. The register 264 may present the status flag PAE at the output 144d. The register 266 may present the status flag PAF at the output 144n.

Examples of the empty/full flag decoder 252, the half-full flag decoder 254, the programmable flag decoder 256, the full flag state machine 258, the empty flag state machine 260, and/or the half-full flag state machine may be found in one or more of the following U.S. Pat. Nos. (i) 5,712,992, (ii) 5,809,339, (iii) 5,627,797, (iv) 5,850,568 and/or (v) 5,852,748, the relevant portions of each which are hereby incorporated by reference.

During the flag generation process, the array read address+1 counter 230 may be used to generate the read address plus one signal RADDRESS+1. The array write address counter 234 may be used to generate the write address signal WADDRESS. The delay logic and register bank 232 may be used to generate the read address signal RADDRESS. The +1 logic and register bank 236 may be used to generate the write address plus one signal WADDRESS+1. The depth control logic may be implemented in the array read address+1 counter 230, the array write address counter 234, and the +1 logic and register bank 236 of the flag addresses circuit 130. The depth control logic within the flag/array address circuit 130 may allow depth expansion that does not require changes within the flag logic circuit 140.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:

a memory configured to read and write data in response to one or more memory address signals;

a flag/array address circuit configured to present one or more flag address signals and array address signals in response to (i) one or more enable signals and (ii) a depth control signal configured to adjust said one or more flag address signals based on a depth of said memory; and a flag logic circuit configured to present one or more status flags in response to said one or more flag address signals.

2. The circuit according to claim 1, wherein said one or more status flags comprise a full flag, an empty flag, a half-full flag, a programmable almost empty flag, a programmable almost full flag, or other status flag.

3. The circuit according to claim 1, wherein said memory comprises (i) a first decoder, (ii) a second decoder and (iii) a memory array, wherein the first decoder is configured to present a first decoded signal to said memory array in response to a first one of said memory address signals and said second decoder is configured to present a second decoded signal to said memory array in response to a second one of said memory address signals.

4. The circuit according to claim 1, wherein said flag/array address circuit is configured to generate said one or more memory address signals.

5. The circuit according to claim 1, wherein said depth control signal comprises one or more depth control signals.

6. The circuit according to claim 1, wherein said flag/array address circuit comprises an array read counter, an array write counter, a delay circuit comprising a delay logic circuit and a first plurality of registers, and a plus one circuit comprising a plus one logic circuit and a second plurality of registers.

7. The circuit according to claim 6, wherein said array read counter is configured to present a first read address signal and said array write counter is configured to present a first write address signal.

8. The circuit according to claim 7, wherein said delay circuit is configured to present a second read address signal in response to said first read address signal.

9. The circuit according to claim 8, wherein said delay circuit is further configured to present said second read address signal in response to said enable read signal.

10. The circuit according to claim 7, wherein said plus one circuit is configured to present a second write address signal in response to said first write address signal.

11. The circuit according to claim 10, wherein said plus one circuit is further configured to present said second write address signal in response to said enable write signal and said control signal.

12. The circuit according to claim 10, wherein a first one of said plurality of flag address signals comprises said first write address signal, a second one of said plurality of flag address signals comprises said first read address signal, a third one of said plurality of flag address signals comprises said second write address signal, and a fourth one of said plurality of flag address signals comprises said second read address signal.

13. The circuit according to claim 1, wherein said flag logic circuit comprises (i) one or more decoders each configured to receive said one or more flag address signals, (ii) one or more state machines, and (iii) one or more registers.

14. The circuit according to claim 13, wherein (i) said one or more decoders is selected from the group consisting of an empty/full decoder, a half full decoder, and a programmable decoder, (ii) said one or more state machines is selected from the group consisting of a full flag state machine, an empty flag state machine, and a half full flag machine.

15. The circuit according to claim 14, wherein said programmable decoder is further configured to receive an offset signal.

16. The circuit according to claim 1, wherein said flag/array address circuit is configured to mask one or more address bits in response to said depth control signal.

17. A circuit comprising:

means for reading and writing data in response to one or more memory address signals;

means for generating one or more flag address signals used as memory address signals and vice versa in response to (i) one or more enable signals and (ii) a depth control signal configured to adjust said one or more flag address signals based on a depth of said means for reading and writing; and means for generating one or more status flags in response to said one or more flag address signals.

18. The circuit according to claim 17, wherein said one or more status flags comprise a full flag, an empty flag, a half-full flag, a programmable almost empty flag, a programmable almost full flag, or other status flag.

19. A method for generating one or more status flags and memory read and/or write operations comprising the steps of:

(A) reading and writing data in response to one or more memory address signals;

(B) generating one or more flag address signals in response to (i) one or more enable signals and (ii) a depth control signal configured to adjust said one or more flag address signals based on a depth of a memory receiving said memory address signals; and (C) generating one or more status flags in response to said one or more flag address signals.

20. The method according to claim 19, wherein step (B) further comprises generating said one or more memory address signals.

21. The method according to claim 19, wherein said one or more status flags comprise a full flag, an empty flag, a half-full flag, a programmable almost empty flag, a programmable almost full flag, or other status flag.

22. The method according to claim 18, further comprising the step of:

masking one or more address bits in response to said depth control signal.

* * * * *